US006754875B1

(12) United States Patent
Paradies

(10) Patent No.: US 6,754,875 B1
(45) Date of Patent: Jun. 22, 2004

(54) APPLYING A COMPUTER-IMPLEMENTED TEST TO DETERMINE WHETHER TO REPLACE ADJACENT CHARACTERS IN A WORD WITH A LIGATURE GLYPH

(75) Inventor: Bernd Paradies, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/193,569

(22) Filed: Nov. 17, 1998

(51) Int. Cl.[7] .............................................. G06F 15/00
(52) U.S. Cl. ..................................... 715/542; 715/540
(58) Field of Search ................................ 707/541, 542, 707/534, 535, 540; 715/542, 540, 541, 534

(56) References Cited

U.S. PATENT DOCUMENTS

| | | | | | |
|---|---|---|---|---|---|
| 4,610,025 | A | * | 9/1986 | Blum et al. ................. | 382/177 |
| 4,670,842 | A | * | 6/1987 | Metwaly ..................... | 715/535 |
| 5,412,771 | A | * | 5/1995 | Fenwick ..................... | 345/468 |
| 5,416,898 | A | * | 5/1995 | Opstad et al. .............. | 707/518 |
| 5,526,477 | A | * | 6/1996 | McConnell et al. ........ | 345/467 |
| 5,832,531 | A | * | 11/1998 | Ayers ......................... | 715/500 |
| 5,926,189 | A | * | 7/1999 | Beaman et al. ............. | 345/467 |
| 6,055,365 | A | * | 4/2000 | Tye ............................. | 716/1 |
| 6,249,908 | B1 | * | 6/2001 | Stamm ........................ | 717/5 |
| 6,253,374 | B1 | * | 6/2001 | Dresevic et al. ............ | 717/11 |
| 6,288,726 | B1 | * | 9/2001 | Ballard ....................... | 345/468 |
| 6,321,243 | B1 | * | 11/2001 | Ballard ....................... | 707/517 |
| 6,370,269 | B1 | * | 4/2002 | Al-Karmi et al. ........... | 382/197 |
| 6,374,259 | B1 | * | 4/2002 | Celik .......................... | 707/104.1 |

FOREIGN PATENT DOCUMENTS

EP          1003109 A2  *  5/2000

OTHER PUBLICATIONS

Lipton, QuickDraw GX Line Layout: Bending the Rules, http://mactech.com/articles/develop/issue_28/lipton. html, Dec. 96 pp. 1–13.*
Phinney, TrueType & PostScript Type 1: What's the Difference?, Google 97, pp. 1–9.*
Chuah et al., Information Rich Glyphs for Software Management Data, IEEE Aug. 98, pp. 24–29.*
Dolfing, A Comparison of Ligature and Contextual Models for Hidden Markov Model Based on–line Handwriting Recognition, IEEE 1998, pp. 1073–1076.*
Jiang et al., Recognition and representation of text characters using rubber band, Document Analysis and Recognition, Oct. 1993, pp. 955–958.*
Obaid et al., Heuristic Approach to the recognition of printed Arabic script, Intelligent Engineering Systems, Sep. 1997, pp. 197–201.*
Zhao et al., A new method for segmenting unconstrained handwitten numeral string, Document Analysis and Recognition, Aug. 1997, pp. 524–527.*
Sun Microsystems, Complex Text Layout Language Support in the Solaris Operating Environment, Google 1998, 1–18.*
Lunde, Accessibility of Unencoded Glyphs, Sep. 1998, Google, pp. 1–5.*

(List continued on next page.)

Primary Examiner—Stephen S. Hong
Assistant Examiner—Cong lac Huynh
(74) Attorney, Agent, or Firm—Fish & Richardson P.C.

(57) ABSTRACT

A computer determines whether to use a ligature glyph in place of adjacent non-ligature characters by identifying adjacent characters in a word that can be represented by a ligature glyph, applying a test to determine whether the adjacent characters occur at a position in the word at which the ligature glyph is allowed to appear, and using the ligature glyph in place of the adjacent characters only if the test is satisfied.

20 Claims, 5 Drawing Sheets

OTHER PUBLICATIONS

Fenton, Inside QuickDraw GX fonts, Oct. 1994, ProQuest pp. 112–127.*

Microsoft Corporation, JSTF—The Justification Table, Mar. 1998, Google, pp. 1–16.*

Scholze–Stubenrecht et al. (Editors): "Duden Rechtschreibung der deutschen Sprache ($21^{st}$ edition, vol. 1)" 1996, Dudenverlag, Mannheim, De XP002203833 p. 69, left–had column, line 15–right hand column, line 11.

Opstad, "Comparing GX Line Layout and OpenType Layout" Internet Citation, 'Online! (Feb. 4, 1998; retrieved Jun. 27, 2002), XP002203723 at web page=http://developer.apple.com/fonts/whitePapers/GXvsOTLayout.html.

Tiro Typeworks (Tiro©Tiro.Com): "Re: Unicode reference fonts" Usenet Citation, 'Online!(Aug. 10, 1998; retrieved Jun. 27, 2002), XP002203729 at web page=http://leb.net/archives/reader/csi/0287.html.

* cited by examiner

APPLYING A COMPUTER-IMPLEMENTED TEST TO DETERMINE WHETHER TO REPLACE ADJACENT CHARACTERS IN A WORD WITH A LIGATURE GLYPH

BACKGROUND

The present invention relates to computer-implemented typesetting.

Printers have long used ligatures to improve the visual appearance of printed text. A ligature is a single printed or written glyph representing multiple characters that appear at adjacent positions in a word. A glyph is a typographical unit of a font, the design and appearance of which is defined by the font designer. Common examples of character combinations that can be printed as ligature glyphs in the English and German languages are the combinations, "ff", "fi" and "ffi", each of which may appear in many fonts as a single glyph.

Some computer applications and operating systems support the automatic display of ligatures on a video monitor or on a printed page. Such programs display a ligature glyph everywhere the ligature occurs, without regard to the glyph's effect on text quality or word meaning. In many languages, including English, automatically displaying a ligature glyph in this manner usually improves, and only rarely reduces, the quality of the appearance of the text. However, automatically placing a ligature glyph in certain word positions, such as at the boundary between words in a compound word, may degrade appearance and may even change the meaning of the word. German typesetters in particular follow precise rules on the use of ligatures, which are set forth in the German Duden, to avoid improper alteration of textual appearance and meaning. Existing ligature insertion algorithms do not always comply with these rules.

SUMMARY

In one aspect, the invention relates to the use of a computer in determining whether to use a ligature glyph in place of adjacent non-ligature characters in a word. First, adjacent non-ligature characters that can be represented by a ligature glyph are identified in the word. A test then is applied to determine whether the characters occur at a position in the word at which the ligature glyph is allowed to appear. The ligature glyph is used in place of the adjacent characters only if the test is satisfied.

In some embodiments applying the test includes retrieving from a table a list of one or more positions within the word at which no ligature glyph is allowed to appear. The word itself is used as a key to retrieve the list from the table. Language information can be used to select the table from a group of language-specific tables. In other embodiments, applying the test includes applying a language-independent rule that governs whether a ligature glyph can appear at the position at which the adjacent characters occur. One such language-independent rule is a rule that prevents the ligature from appearing at the boundary between words in a compound word. In alternative embodiments, the ligature glyph is used in place of the adjacent characters only when the word is rendered on a display, such as a computer monitor or a printed page, or the ligature glyph is used to replace the adjacent characters in an underlying electronic representation of the word, such as in an electronic copy of a word processing document.

In another aspect of the invention, a computer determines whether to use a ligature glyph in place of adjacent non-ligature characters by receiving information identifying a word, using this information to retrieve from a look-up table a list of one or more positions in the word at which no ligature is allowed to appear, and applying the list in determining whether to display the ligature glyph in place of the adjacent characters. In some embodiments, the computer receives information identifying a language with which the word is associated and uses this information to select the look-up table from a group of language-specific look-up tables.

BRIEF DESCRIPTION OF THE DRAWINGS

Like reference numbers and designations in the various drawings indicate like elements.

DETAILED DESCRIPTION

Figure 1:
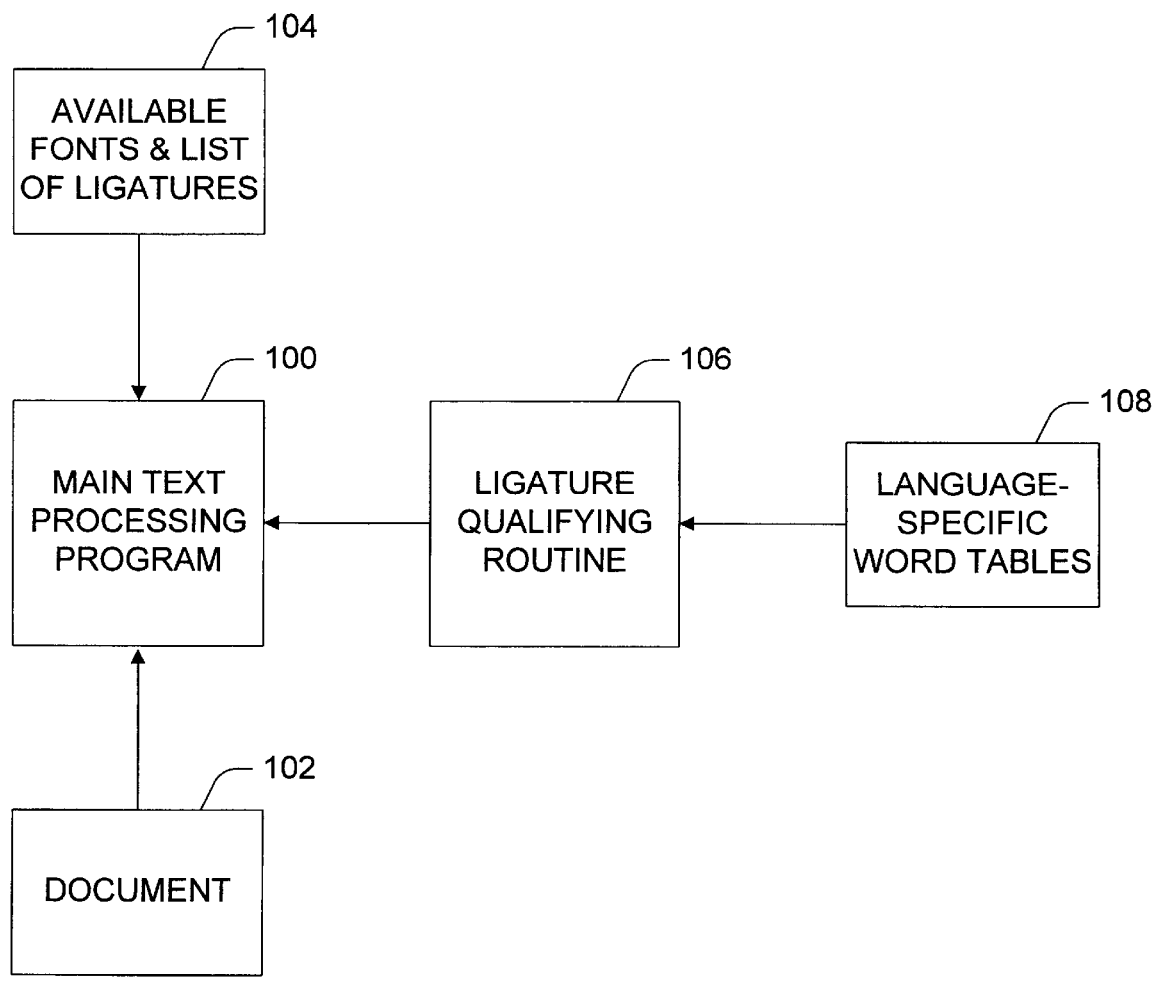
FIG. 1 is a functional block diagram of a word processing program with a ligature qualifying function.

FIG. 1 shows the flow of data into a text processing program 100, such as a desktop publishing application or a word processing application, running in a computer and operating in accordance with the invention. The program 100 operates on an electronic document 102 generated by the application or retrieved from storage. Before rendering the document 102, the program searches the document for adjacent characters that can be represented by a ligature on a display, such as a monitor or a printer, accessing a collection of available fonts 104 and a list of ligatures available in each font. The program 100 calls a ligature qualifying routine 106 upon discovering a ligature candidate to determine whether to display the corresponding glyph on the monitor or printed page. The ligature qualifying routine 106 in turn accesses one or more language-specific word tables 108 to retrieve information indicating whether the ligature glyph can appear in the displayed word. In alternative embodiments, the program 100 replaces the characters with the ligature glyph only in the rendered text at the time of rendering, or the program 100 permanently replaces the characters with the ligature in the electronic document 102 itself.

Figure 2:
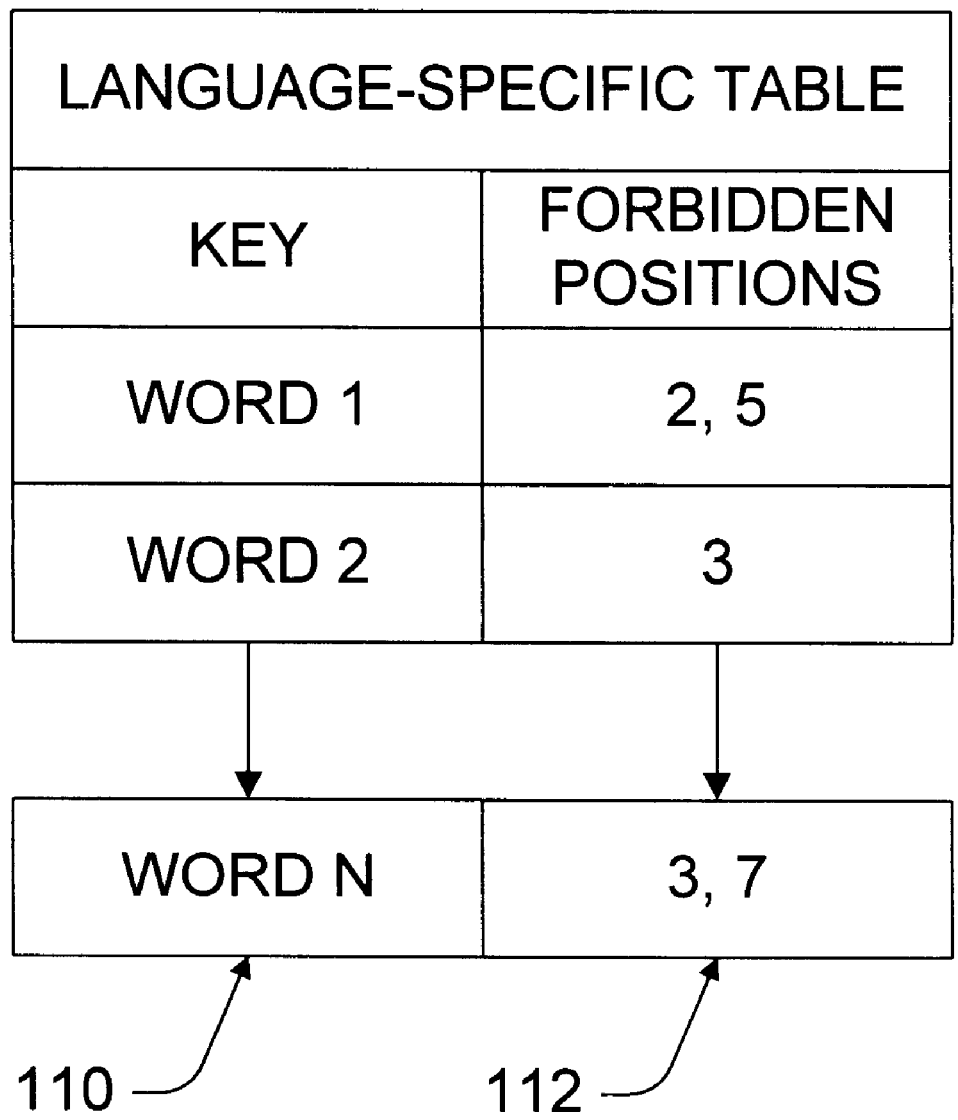
FIG. 2 is a diagram illustrating the structure of a language-specific word table that identifies the positions in various words at which ligatures cannot appear.

FIG. 2 shows a language-specific look-up table containing a list of those words 110 for which ligature glyphs should not be displayed at certain positions. The table contains, for each word in the list 110, a numerical array 112 indicating the positions of any ligature candidates in the word for which a ligature glyph should not be used.

Figure 3A:
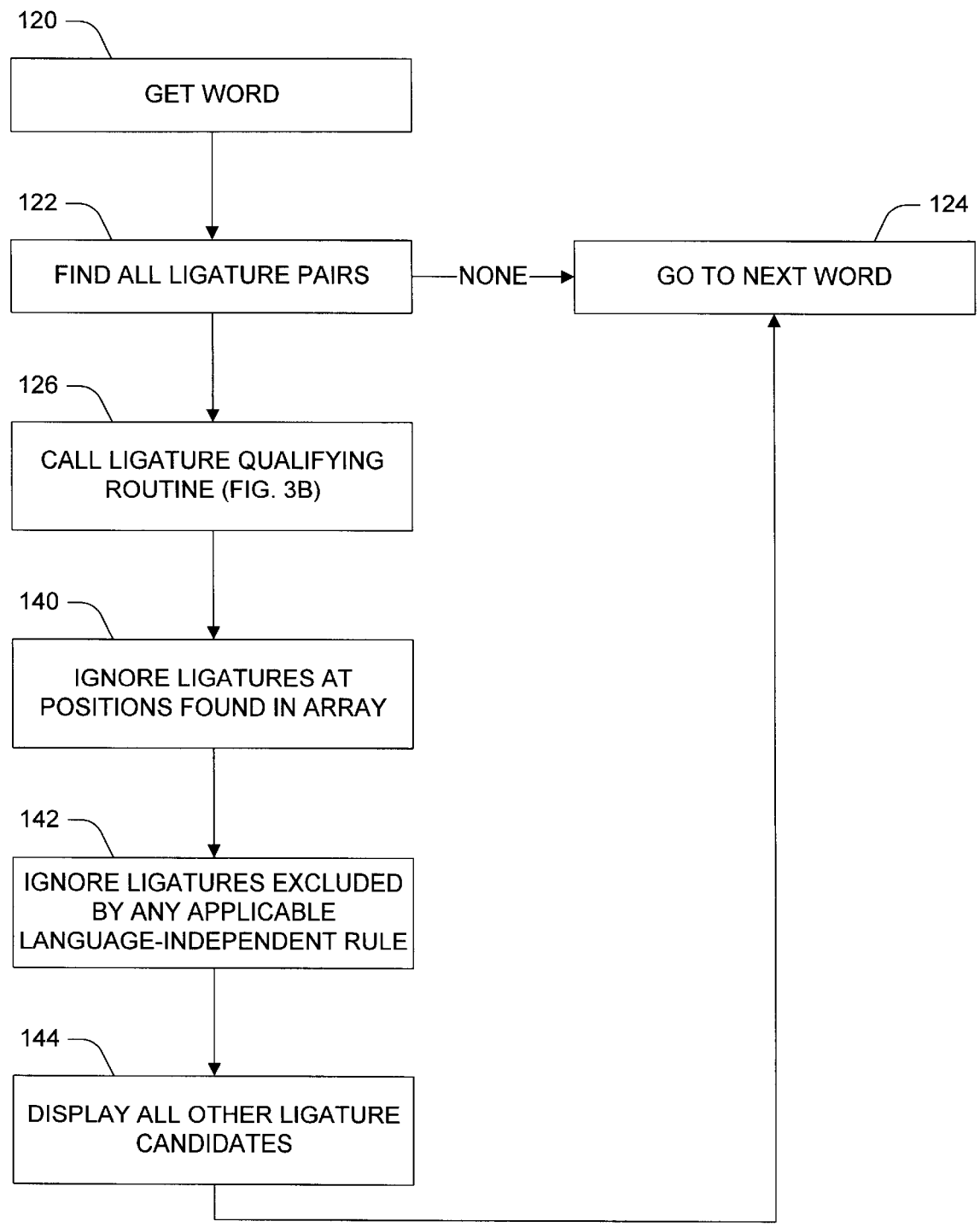
FIGS. 3A and 3B together are a flow chart for a process that determines whether to display a ligature glyph in a word.
Figure 3B:
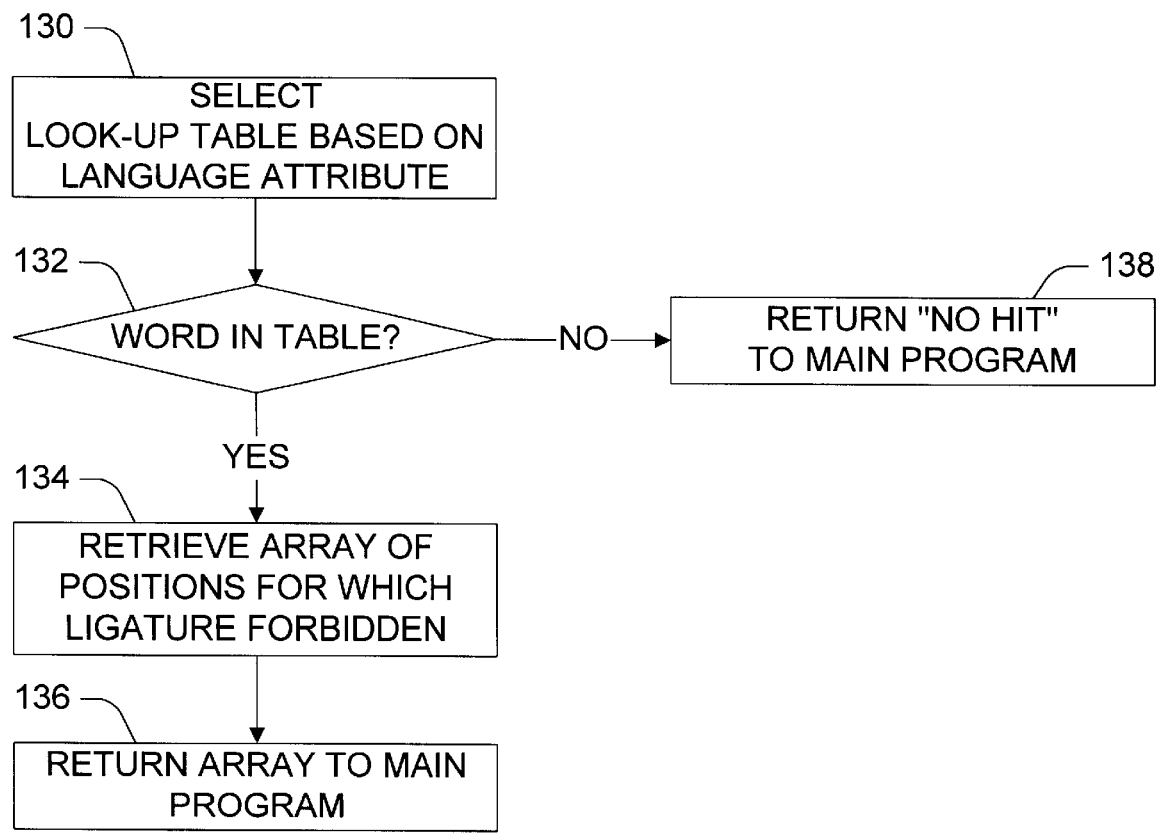

FIGS. 3A and 3B are a flow chart for an implementation of a ligature qualifying process. The main program 100 (FIG. 1) retrieves a word from the document (step 120) and determines whether the word contains a candidate ligature recognized by the font (step 122). If not, the program moves to the next word (step 124). If the word does include one or more candidate ligatures, the program calls the ligature qualifying routine, passing the word and a language indicator as input (step 126).

As shown in FIG. 3B, the ligature qualifying routine uses the language indicator to select an appropriate look-up table (step 130) and then searches for the word in the table (step 132). If the word appears in the table, the routine retrieves the corresponding array of positions for which ligature glyphs are forbidden (step 134) and returns the array to the main program (step 136). If the word does not appear in the table, the qualifying routine returns a "no hit" value to indicate that no word-specific rule applies to exclude ligature display (step 138).

Upon receiving the array of forbidden positions, the program (FIG. 3A) examines the information in the array to determine whether any candidate ligatures are forbidden in the word. For each forbidden candidate ligature, the program ignores the corresponding ligature glyph (step 140). The program then determines whether any general rule applies to exclude the ligature glyph (step 142). A general rule may be language-specific or language-independent and may apply to any word in a language. For example, some versions of the program apply a language-independent rule that prohibits the use of a ligature glyph at a word boundary in a compound word, such as the ligature "fl" in the word "halflife." One technique for implementing a general rule that prohibits ligature glyphs in compound words is the application of a standard compound-word spelling algorithm, such as those found in the off-the-shelf spelling libraries available from Proximity, SoftArt, and Inso.

If the program determines that no word-specific or general rule applies to exclude a ligature candidate, the program inserts the corresponding glyph when displaying the word (step 144). Otherwise, the program ignores the glyph and qualifies any remaining ligatures in the same manner. The program then moves to the next word and repeats the process.

The invention can be implemented in any combination of digital electronic circuitry and computer hardware, firmware, and software. Devices employing the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, e.g., both general and special purpose microprocessors. Generally, a processor will receive instructions and data from a read-only memory and/or a random access memory. Storage devices suitable for tangibly embodying computer program instructions and data include all forms of non-volatile memory, including, e.g., semiconductor memory devices, such as EPROM, EEPROM, and flash memory devices; magnetic disks, such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device, such as a monitor or LCD screen, for displaying information to the user and a keyboard and a pointing device, such as a mouse or a trackball, by which the user can provide input to the computer system. The computer system can be programmed to provide a graphical user interface through which computer programs interact with users. For example, upon discovering a ligature candidate in a word, a computer embodying at least one version of the invention displays a graphical dialog box identifying the word and the adjacent characters for which a ligature is available. The user may choose to insert or ignore the ligature candidate by selecting an appropriate command button in the dialog box with the mouse.

Figure 4:
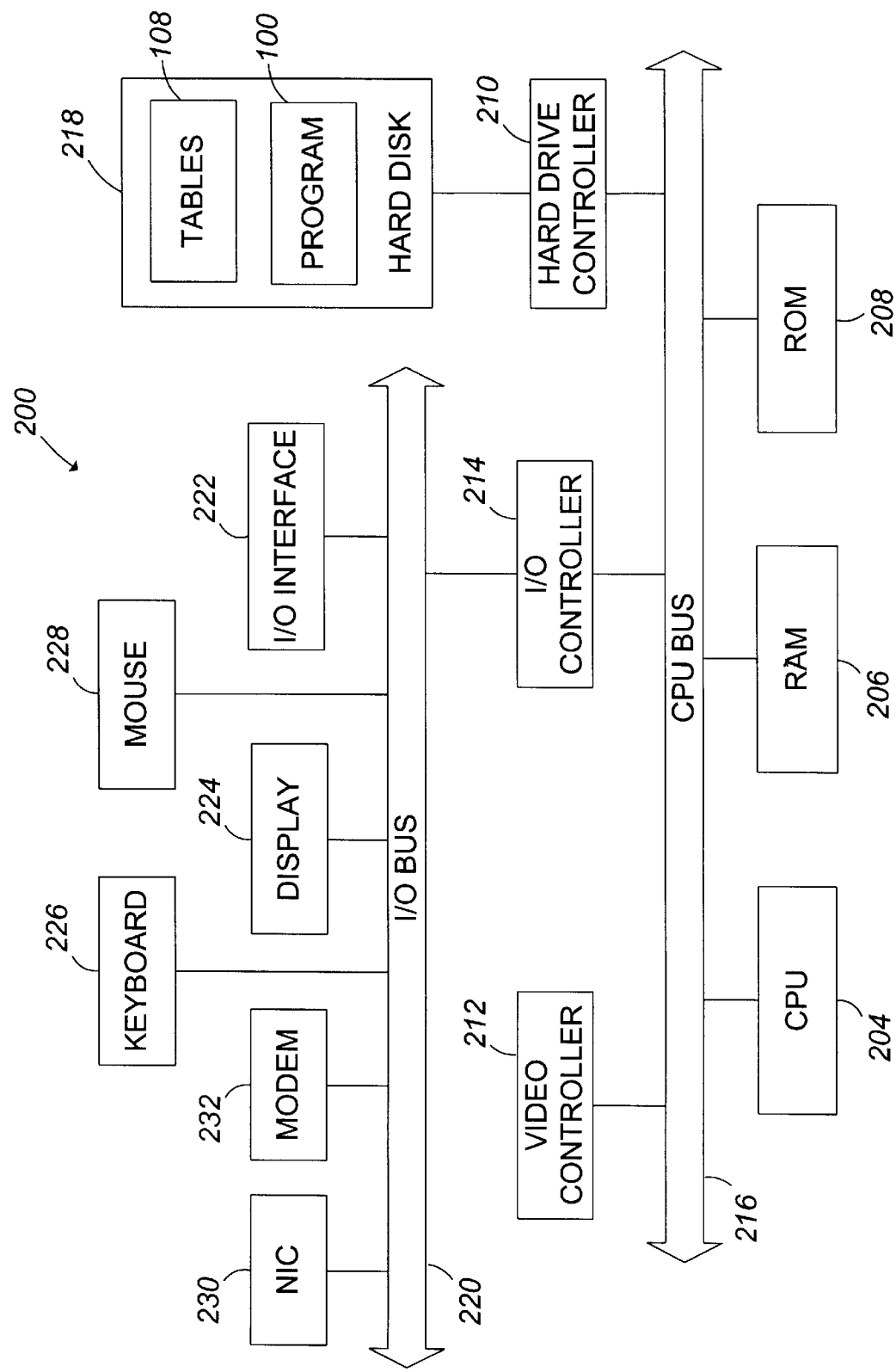
FIG. 4 is a block diagram of a computer system suitable for implementing the present invention.

An example of one such system computer is shown in FIG. 4, which is a block diagram of a programmable processing system 200 suitable for implementing the invention. The system includes a processor (CPU) 204; a random access memory (RAM) 206; a program memory 208, e.g., a writable read-only memory (ROM) such as a flash ROM; a hard drive controller 210; a video controller 212; and an input/output (I/O) controller 214, all coupled, directly or indirectly, by a processor (CPU) bus 216. The system 200 can be preprogrammed, e.g., in ROM, or it can be programmed (and reprogrammed) by loading a program from another source, such as a floppy disk, a CD-ROM, or another computer.

The hard drive controller 210 is coupled to a hard disk 218 suitable for storing executable computer programs, including the main text processing program 100 and other programs embodying the present invention. The hard disk 218 also may store data, including the language-specific look-up tables 108 accessed by the ligature qualifying routine.

The I/O controller 214 is coupled by means of an I/O bus 220 to an I/O interface 222. The I/O interface 222 receives and transmits data (e.g., stills, pictures, movies, and animations for importing into a composition) in analog or digital form over communication links such as a serial link, a local area network, a wireless link, and a parallel link.

A display 224, a keyboard 226, a mouse 228 or trackball, a network interface card (NIC) 230 and a modem 232 also may be coupled to the I/O bus 220. Alternatively, separate connections (separate buses) can be used to couple some of these devices, including the I/O interface 222, the display 224 and the keyboard 226.

The invention has been described in terms of particular embodiments. Other embodiments are within the scope of the following claims. For example, the steps of the invention can be performed in a different order and still achieve desirable results. The invention also can be implemented using other computer programming algorithms and data storage strategies, such as storing ligature insertion rules in look-up tables derived from the Btree-Algorithm, described by Niklaus Wirth in "Algorithms and Data Structures" (1985). Also, the ligature qualifying process can be carried out by applying only the language-specific look-up tables and foregoing the general rules of exclusion, or the program can apply only the general rules and forego the look-up tables. Moreover, the invention can be carried out by specifying where ligature glyphs are allowed instead of where they are forbidden.

What is claimed is:

1. A computer-implemented method for determining whether to use a ligature glyph to represent adjacent non-ligature characters, the method comprising:

identifying adjacent non-ligature characters for which there is a corresponding ligature glyph, the adjacent non-ligature characters occurring at a particular position in a particular word;

using the particular word as a key to retrieve from a table a list of one or more positions within the particular word at which no ligature glyph is allowed to appear;

determining, based on the list and the particular position in the particular word, whether any ligature glyph is allowed to appear at the particular position in the particular word; and using the ligature glyph to represent the adjacent non-ligature characters only if any ligature glyph is allowed to appear at the particular position in the particular word.

2. The method of claim 1, further comprising:

applying a language-specific test to determine whether the ligature glyph is allowed to represent the adjacent non-ligature characters.

3. The method of claim 1, wherein the determining includes using language information to select the table from a group of language-specific tables.

4. The method of claim 1, further comprising:

applying a language-independent rule that governs whether the ligature glyph can appear at the position at which the adjacent non-ligature characters occur.

5. The method of claim 1, further comprising:

applying a rule to determine whether the adjacent non-ligature characters lie between words in a compound word.

6. The method of claim 1, wherein the ligature glyph is used to represent the adjacent non-ligature characters only when the word is rendered for display.

7. The method of claim 1, wherein:

the ligature glyph is associated with a corresponding ligature; and the ligature is used to replace the adjacent non-ligature characters in an underlying electronic representation of the word.

8. A computer program, residing on a computer-readable medium, for determining whether to display a ligature glyph to represent adjacent non-ligature characters, the program comprising executable instructions that enable the computer to:

identify adjacent non-ligature characters for which there is a ligature glyph, the adjacent non-ligature characters occurring at a particular position in a particular word;

use the particular word as a key to retrieve from a table a list of one or more positions within the particular word at which no ligature glyph is allowed to appear;

determine, based on the list and the particular position in the particular word, whether any ligature glyph is allowed to appear at the particular position in the particular word; and display the ligature glyph to represent the adjacent non-ligature characters only if any ligature glyph is allowed to appear at the particular position in the particular word.

9. The program of claim 8, further comprising instructions to:

apply a language-specific test to determine whether the ligature glyph is allowed to represent the adjacent non-ligature characters.

10. The program of claim 8, wherein the program enables the computer to use language information to select the table from a group of language-specific tables.

11. The program of claim 8, further comprising instructions to:

apply a language-independent rule that governs whether the ligature glyph can appear at the position at which the adjacent non-ligature characters occur.

12. The program of claim 8, further comprising instructions to:

apply a rule to determine whether the adjacent non-ligature characters lie between words in a compound word.

13. The program of claim 8, wherein the ligature glyph is used to represent the adjacent non-ligature characters only when the word is rendered for display.

14. The program of claim 8, wherein:

the ligature glyph is associated with a ligature; and the ligature is used to replace the adjacent non-ligature characters in an underlying electronic representation of the word.

15. A computer program, residing on a computer-readable medium, for determining whether to use a ligature glyph to represent adjacent non-ligature characters, the program comprising executable instructions that enable the computer to:

receive information identifying a particular word;

use the particular word as a key to retrieve from a look-up table a list of one or more positions in the particular word at which no ligature glyph is allowed to appear; and apply the list in determining whether to display the ligature glyph in place of the adjacent characters.

16. The program of claim 15, wherein the program enables the computer to receive information identifying a language with which the word is associated and to use this information to select the look-up table from a group of language-specific look-up tables.

17. A computer program product, tangibly stored on a machine-readable medium, for displaying text that includes a word having adjacent non-ligature characters for which there is a corresponding ligature glyph, the product comprising instructions operable to cause a programmable processor to:

use the word as a key to retrieve from a table a list of one or more positions in the word at which no ligature glyph is allowed to appear; and determine, based on the list and the position at which the adjacent non-ligature characters appear within the particular word, whether the adjacent non-ligature characters occur at a position in the word where the ligature glyph is allowed to appear and, if the ligature glyph is allowed to appear at the position of the adjacent non-ligature characters, automatically display the text with the ligature glyph, and if not, automatically display the text without the ligature glyph.

18. A computer program product, tangibly stored on a machine-readable medium, for determining whether to display a ligature glyph at a position in a word, the product comprising instructions operable to cause a programmable processor to:

receive information specifying a particular ligature glyph and a particular position in a particular word;

use the word as a key to retrieve from a table a list of one or more positions in the word at which no ligature glyph is allowed to appear;

determine, based on the list and the particular position in the particular word, whether any ligature glyph is allowed to appear at the particular position in the particular word; and when any ligature glyph is allowed to appear at the particular position in the particular word, display the particular ligature glyph at the particular position in the particular word.

19. A computer-implemented method for determining whether to use a ligature glyph to represent adjacent non-ligature characters, the method comprising:

identifying adjacent non-ligature characters for which there is a corresponding ligature glyph, the adjacent non-ligature characters occurring at a particular position in a particular word;

using the particular word as a key to retrieve from a table a list of one or more positions within the particular word where no ligature glyph is allowed;

determining, based on the list and the particular position, whether the particular position in the particular word is one where no ligature glyphs are allowed to appear; and using the ligature glyph to represent the adjacent non-ligature characters only if the particular position in the particular word is not one where no ligature glyph is allowed to appear.

20. A computer program product, tangibly stored on a machine-readable medium, for determining whether to display a ligature glyph at a position in a word, the product comprising instructions operable to cause a programmable processor to:

receive information specifying a particular ligature glyph and a particular position in a particular word;

use the particular word to retrieve from a table a list of one or more positions within the particular word where no ligature glyph is allowed;

determine, based on the list, whether the particular position in the particular word is one where no ligature glyphs are allowed to appear; and when the particular position in the particular word is not one where no ligature glyphs are allowed to appear, display the particular ligature glyph at the particular position in the particular word.

\* \* \* \* \*